(12) United States Patent
Rowland et al.

(10) Patent No.: US 7,428,587 B2
(45) Date of Patent: Sep. 23, 2008

(54) GENERATING GLOBALLY UNIQUE DEVICE IDENTIFICATION

(75) Inventors: Craig Rowland, Monroe, WA (US); Adam Sandford, Seattle, WA (US); Shobana Balakrishnan, Redmond, WA (US); Mark McCasey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 837 days.

(21) Appl. No.: 10/462,046

(22) Filed: Jun. 13, 2003

(65) Prior Publication Data
US 2004/0122931 A1 Jun. 24, 2004

Related U.S. Application Data

(60) Provisional application No. 60/434,996, filed on Dec. 19, 2002.

(51) Int. Cl.
G06F 15/173 (2006.01)
(52) U.S. Cl. ...................................... 709/224
(58) Field of Classification Search .................. 709/224
See application file for complete search history.

(56) References Cited

U.S. PATENT DOCUMENTS

| | | | | |
|---|---|---|---|---|
| 6,134,659 A * | 10/2000 | Sprong et al. | ............... | 713/190 |
| 6,470,378 B1 * | 10/2002 | Tracton et al. | ............... | 709/203 |
| 6,507,847 B1 * | 1/2003 | Fleischman | ................. | 707/101 |
| 6,832,241 B2 * | 12/2004 | Tracton et al. | ............... | 709/203 |
| 6,981,158 B1 * | 12/2005 | Sanchez et al. | ................ | 726/2 |
| 7,062,550 B1 * | 6/2006 | Hutchinson et al. | ......... | 709/224 |
| 7,117,182 B2 * | 10/2006 | Chess et al. | .................... | 705/74 |
| 7,124,441 B1 * | 10/2006 | Gaston | ........................ | 726/26 |
| 2002/0131764 A1 * | 9/2002 | David et al. | .................... | 386/69 |
| 2002/0170013 A1 * | 11/2002 | Bolourchi et al. | ........... | 714/758 |
| 2003/0061488 A1 * | 3/2003 | Huebler et al. | .............. | 713/176 |
| 2003/0145203 A1 * | 7/2003 | Audebert et al. | ............ | 713/169 |
| 2003/0172175 A1 * | 9/2003 | McCormack et al. | ....... | 709/232 |
| 2004/0002877 A1 * | 1/2004 | Angelo et al. | .................. | 705/7 |
| 2004/0243701 A1 * | 12/2004 | Hardwicke et al. | .......... | 709/224 |

OTHER PUBLICATIONS

Liu, Q. et al., "Digital Rights Management for Content Distribution", *Conferences in Research and Practice in Information Technology Series, proceedings of the Australasian Information Security Workshop Conference on ACSW Frontiers*, 2003, 21, 49-58.

* cited by examiner

*Primary Examiner*—Jason Cardone
*Assistant Examiner*—Thomas Duong
(74) *Attorney, Agent, or Firm*—Woodcock Washburn LLP

(57) ABSTRACT

A globally unique device identification is created. Initially, for a device, polling is performed for information regarding certain hardware components, such as hard disks, network cards, sound cards, video cards, etc. A device identifier is assigned to the device, which in one embodiment, is based on the hardware component information. The device identifier and the current information regarding the hardware components of the system are stored in a repository. Periodically, a new poll is performed of the hardware components of the system, and the current hardware component information in the repository is updated. A device is identified by the identity or similarity of the hardware component information read from the device with the stored current hardware component information.

20 Claims, 4 Drawing Sheets

GENERATING GLOBALLY UNIQUE DEVICE IDENTIFICATION

CROSS-REFERENCE TO RELATED APPLICATIONS

This application claims benefit under 35 USC 119(e) of U.S. Provisional Application Ser. No. 60/434,996, filed Dec. 19, 2002 and entitled "Methods and Systems for Generating Component Level Hardware Inventory."

FIELD OF THE INVENTION

This invention relates in general to the field of computer device identification. More, particularly, this invention relates to generation of globally unique device identification.

BACKGROUND OF THE INVENTION

Large networks of computer devices are often utilized in organizations. For example, an installation in which each individual user has a device, and these user devices are connected by a network is common. In such an installation, it may be useful to be able to consistently identify each device. One way to provide consistent identification is to rely on each device to identify itself on the network with a pre-assigned identity. However, there are coordination difficulties with this system. In order to prevent duplication, identities must be assigned by a central authority. If the authority is unavailable, new devices can not be assigned a network identity. This may delay the use of a new device on the network. If two networks in which devices have been assigned identities pursuant to one system of creating device identities are merged, identities of computers on the two networks may overlap.

An additional problem may arise if a device on the network can not be trusted to identify itself. This may occur if devices are unreliable at storing and providing their identities upon request. For example, if a device experiences a memory problem, it may not be able to retain or access its assigned identity. Additionally, an intruder may change or misrepresent the identity of a device with malicious intent.

Another way to provide consistent information is with a UUID (universally unique ID) stored as part of the SMBIOS (System Management Basic Input/Output System) information stored on the device by the manufacturer thereof. The UUID is intended to be universally unique. However, since there are a number of manufacturers, UUID information may be unique to one manufacturer but replicated by another manufacturer. Additionally, manufacturers may not be scrupulous in placing unique UUID information in devices.

A HWID (hardware identity) may also be used to consistently identify devices. If a HWID is used, information regarding two or more hardware components is used to create a device identifier. However, if these components change, for example, if a CD drive serial number is used and the CD drive must be exchanged, the HWID may change and thus the device may no longer be identifiable as the same device.

Therefore, a system for identifying devices which is consistent over time and provides globally unique identities for devices while solving the abovementioned problems and other problems is desirable.

SUMMARY OF THE INVENTION

A globally unique device identification for a computer device is created. Initially, polling is performed for information regarding certain hardware components, such as hard disks, network cards, sound cards, video cards, etc. In one embodiment, these identities are combined to create an identifier which is assigned to the device.

A device identifier and the current information regarding the hardware components of the system are stored in a repository. Periodically, a new poll is performed of the hardware components. Even if some hardware component information changes, indicating that those hardware components may have changed, the device can be identified through its similarity with the information stored. Tolerances must be set to determine how different a device can be from the stored information and still be identified as the same device.

Once a device is identified as corresponding to a device identifier, the current information regarding the hardware components of the system are updated to reflect the new information received from the device. Thus, when hardware components are changed, these changes are tracked.

This allows a device to be identified in a globally-unique way which is consistent over time, even where the hardware components of the device change substantially over time.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Computing Environment

Figure 1:
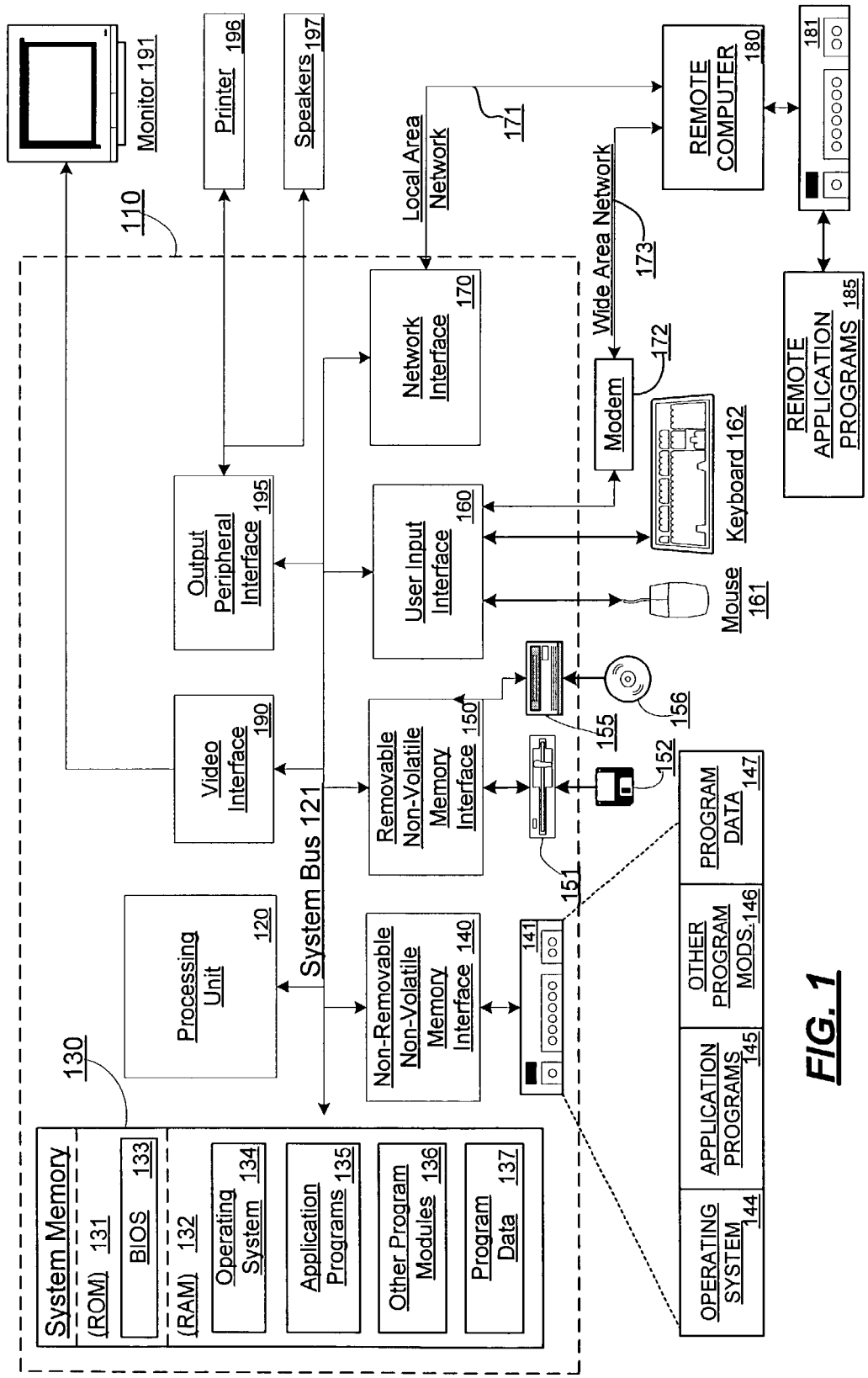
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Generating Globally Unique Device Identifications

Figure 2:
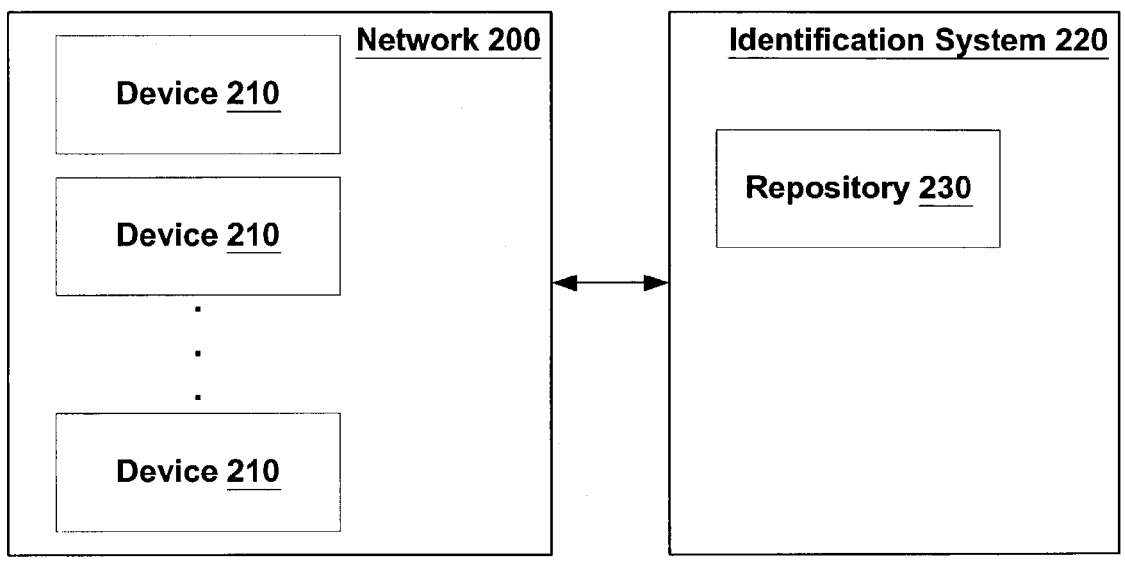
FIG. 2 is a block diagram of a network and an identification system according to one embodiment of the invention.

FIG. 2 is a block diagram of a network and an identification system according to one embodiment of the invention. As shown in FIG. 2, in one embodiment, a network 200 consists of devices 210. An identification system 220 containing a repository 230 is in or connected to network 200 in such a way as to enable communication between the identification system 220 and devices 210. In order to identify one of devices 210, information from that device is received by identification system 220. The information in repository 230 is consulted. If a matching record for that device is found in the repository, the data in repository 230 is updated, if necessary, so that the repository contains the most current information regarding that device. If a matching record for that device is not found in repository 230, a new record for that device is added to repository 230.

In one embodiment, the ID system 220 sets a device ID is for the device 210 and stores the device ID along with other information gathered from the device in the repository 230. In one embodiment, a unique device ID is selected and stored with the hardware information. In another embodiment, the device ID is based on the hardware information. Where the device ID is based on the hardware information, this device ID will be globally unique. This will allow, for example, repositories for two networks to be combined if the networks are joined, without redundant device identity problems.

The information received from the device 210 is information regarding certain hardware components of the device is obtained. In one embodiment, the information obtained includes information regarding:

the UUID from SMBIOS the model information from SMBIOS the manufacturer information from the SMBIOS the serial number from the SMBIOS the serial number of the boot hard disk drive (a serial number put by the manufacturer into the ROM of a hard disk drive such as hard disk drive 141 in FIG. 1);

the MAC (media access control) address of the Ethernet card, if there is one;

the MAC address of the second Ethernet card, if there is one; and the machine name stored on the device.

In one embodiment, device identities are assigned to devices polled based on hashed versions of the information collected from the device. In one embodiment, two hashes, H1 and H2 are created for this purpose. By assigning devices H1 or H2 as the device identity, the search performed on the records in the repository 230 is less time-consuming than if all elements of the record are checked. In one embodiment, hash H1 is created from the UUID, model information, manufacturer information, and serial number from the SMBIOS. In one embodiment, hash H2 is created from the serial number of the boot hard disk drive and the two MAC addresses of Ethernet cards. Any hashing algorithm may be used to generate each hash. As in any hash generation, a balance must be struck between the size of the resulting hash and possible duplication of resulting hash values for two different devices.

Some of these pieces of information may not exist. For example, it is possible that the SMBIOS data table does not exist. In that case, in one embodiment, H1 is set to a null value.

A periodic poll may occur which requests all devices 210 on the network 200 provide their identity to the ID system 220. In one embodiment, for each device, H1 and H2 are produced and these are used to find a matching record in the repository 230. If no such record is found, the repository is updated to include a new record for the device 210. First, a search is performed in the repository 230 for a device with device ID equal to H1. If no such device is found, the hardware information is stored in a new record in the repository along with a device ID of H1 for the device H1.

Duplicate H1s may occur, though. For example, it is possible that a manufacturer does include a SMBIOS table but fills each SMBIOS table with identical information—for example, all 1's, or an arbitrary value which is the same for each system. In one embodiment, if an existing device ID equal to H1 is found, or if H1 is null, the UUID is checked. If the UUID is valid (not all ones, for example) then it is assumed that the record in the repository 230 with a device ID matching H1 and a valid UUID is the same device 210 that information has been gathered from. In this case, the stored hardware information for such device 210 in the repository 230 is updated with the gathered hardware component information.

If H1 is duplicated but no pre-existing entry is found in the repository 230, the repository 230 is searched for a device ID which matches H2. If a match is found, the existing record is assumed to be the device which the information has been gathered from. That existing record is updated with the newly gathered information. If no match is found, the records in the repository 230 are searched for a matching first or second Ethernet MAC address or a matching boot hard disk drive serial number. If a match is found with a record in the repository 230, the machine name field in the record is compared with the gathered machine name. If they match, it is assumed that it they are the same record. If they do not match, it is assumed that the device from which information has been gathered does not correspond to any record in the repository 230. A new record is therefore created with a machine ID of H2.

This procedure for updating the repository 230 can also be understood with reference to the following pseudocode, which tracks the description of the procedure above:

```
Update Repository {
    If gathered H1 != NULL
        Search in repository for a DeviceID matching gathered H1
        If no match is found
        {
            Create a new record with DeviceID = H1
            Store gathered information in new record
            End
        }
        Else
            If UUID is valid
            {
                Update matched record with gathered information
                End
            }
    Search in repository for a DeviceID matching gathered H2
```

```
-continued

If a match is found
        {
            Update the matched record with the gathered information
            End
        }
        Else
        {Search for a record with a matching (a) first
        Ethernet MAC
address, (b) second Ethernet MAC address, or (c) boot hard disk
drive serial
number
            If a match is found
                Compare matched Machine Name with gathered
                Machine
Name
                If they match
                    Update matched record with gathered
                    data
                Else
                {
                    Create a new record with DeviceID = H2
                    Store gathered information in new record
                }
```

The ability to continuously update the hardware information stored in the repository 230 allows for gradual change in the hardware components of devices over time to occur while maintaining the continuity of device identity.

In addition to hardware component information, other hardware component information may be gathered and stored in the record for device 210, including:

the asset number from SMBIOS;

the physical RAM size the RAM clock speed;

accelerated graphics port (AGP) memory;

the vendor ID of the boot hard disk drive; and the product ID of the boot hard disk drive.

Figure 3:
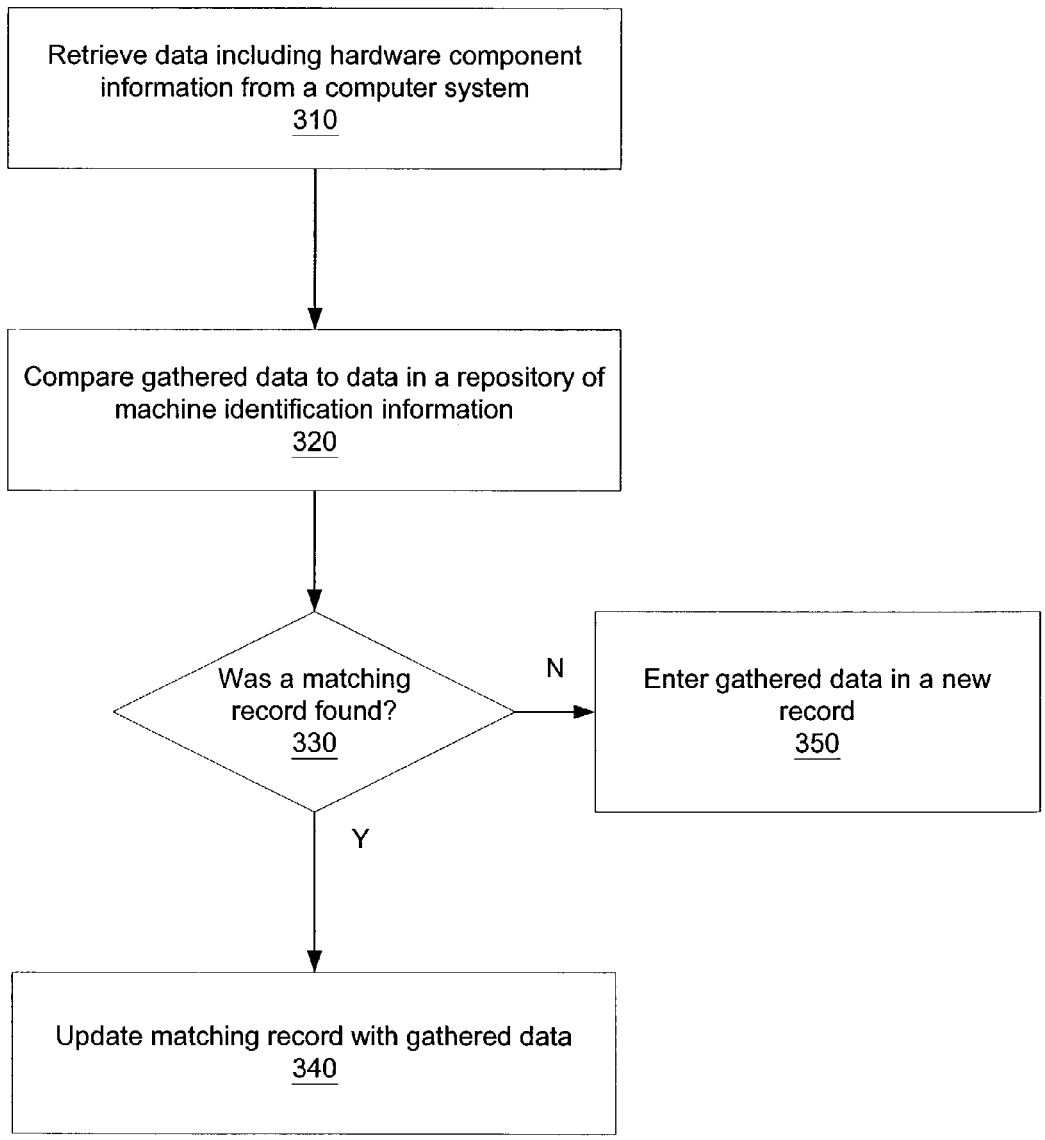
FIG. 3 is a flow diagram of a method for maintaining device identities according to one embodiment of the invention.

In order to maintain device identities over time, updating of the record data to reflect changes should occur periodically. FIG. 3 is a flow diagram of a method for maintaining device identities according to one embodiment of the invention. First, data including hardware component information is retrieved from a device, in step 310. Then, the data is compared to data in a repository of device identification in step 320. If a matching record is found (decision 330), then the data is updated in step 340. If no matching record is found, then, in one embodiment, the data is entered as a new record in the repository in step 350. In one embodiment, periodically all devices 210 in network 200 are polled to maintain device identity integrity.

Figure 4:
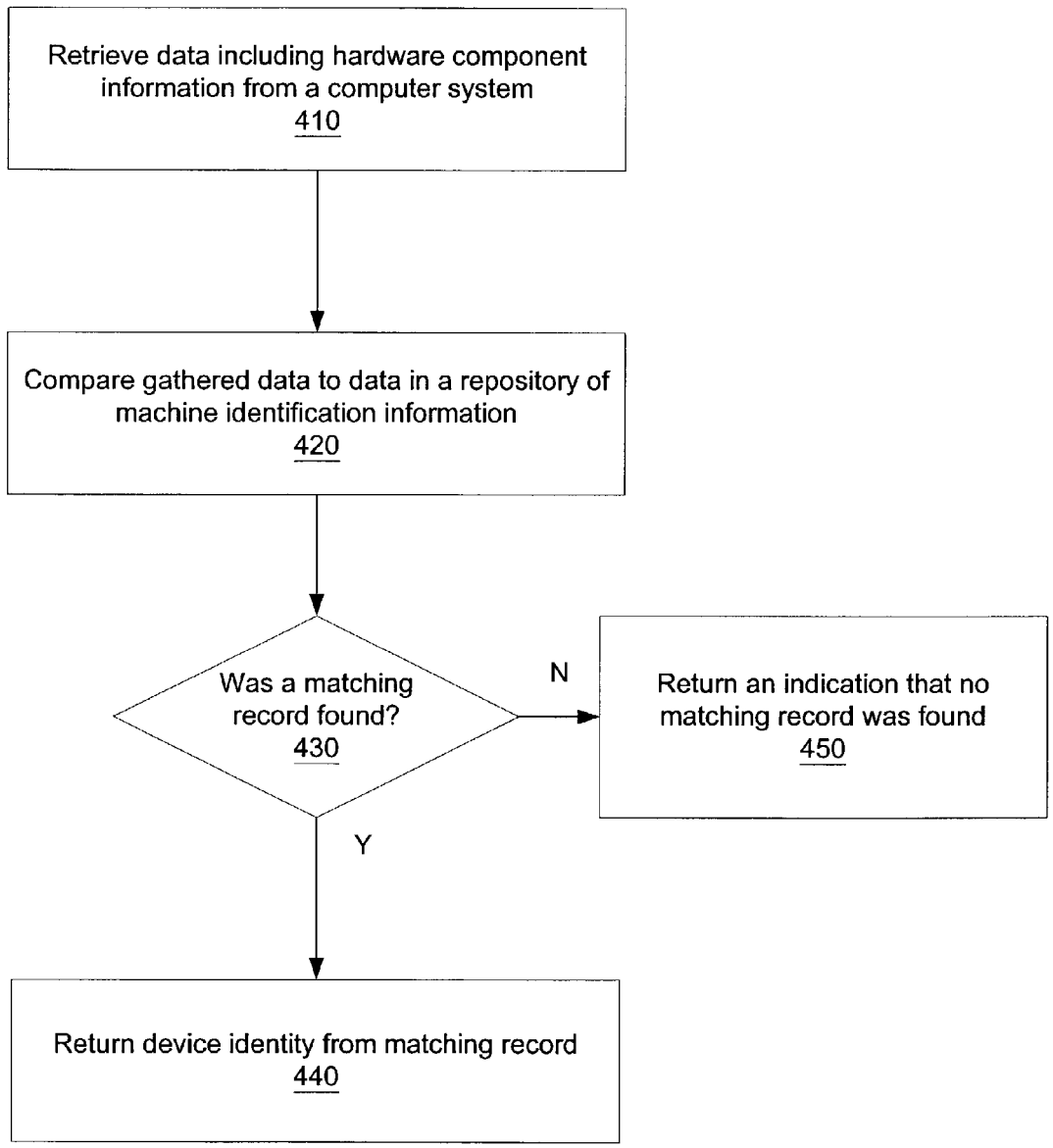
FIG. 4 is a flow diagram of a method for identifying a system according to one embodiment of the invention.

An identification system is contemplated using the invention. For this, the information for a specific device is gathered and the assigned device identity, if any, for that device in the repository is found. FIG. 4 is a flow diagram of a method for identifying a system according to one embodiment of the invention. First, data including hardware component information is retrieved from a device, in step 410. Then, the data is compared to data in a repository of device identification in step 420. If a matching record is found (decision 430), then the device identity stored in the matching record is returned as the identity for the system queried in step 440. In one embodiment, step 440 additionally includes an update of the record with any changed information from the system. If no matching record is found, then an indication that the system was not found is returned in step 450. In one embodiment, step 450 additionally or alternatively includes entering the data for the system as a new record in the repository.

In the embodiment described in the pseudocode, the resolution of systems which have no UUID data and have had a hardware change in the boot hard disk drive or Ethernet resulting in a change in H2, the machine name is relied upon. H1 is relied on before H2, and therefore SMBIOS information takes precedence over the hardware changes. In other embodiments, other hardware components are gathered, other hashes may be performed, and checking is performed in other combinations.

In one embodiment, different amounts of data may be gathered from device in different modes. For example, one mode, a minimal mode, may gather only information necessary to determine device identity. In a medium mode, some of the other information not used for determining device identity is gathered. In a full mode, all data is gathered. A privacy mode may also exist, in which any information which may be considered confidential is not gathered.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for maintaining device identity of a particular device in a network, comprising:

receiving, from a device over a network connection, identification information stored in firmware of a main board of the device, and a plurality of serial numbers for a plurality of hardware components currently attached to the main board of the device, wherein the firmware includes a unique identifier for the main board;

generating a first hash value and a second hash value, wherein the first hash value is generated from the information stored in the firmware of the main board and the second hash value is generated from the plurality of serial numbers for the plurality of hardware components currently attached to the main board of the device;

searching a repository for a record that includes the first hash value, wherein the record includes a previously obtained plurality of serial numbers of hardware components that were previously attached to the main board of the device;

determining, when a record that includes the first hash value is found, that a serial number of a specific component does not match a serial number of a previously attached component of the same type; and updating the record to include the serial number of the specific component.

2. The method of claim 1, said method further comprising:

searching, when a record that includes the first hash value is not found, the repository for a record that includes the second hash value; and updating, when a record that includes the second hash value is found, the record to include the identification information stored in firmware of a main board of the device.

3. The method of claim 2, further comprising:
searching, when a record that includes the second hash value is not found, the repository for a record that includes a machine name associated with the device; and
updating, when a record that includes the second hash value is not found, the record that includes the machine name associated with the device to include the plurality of serial numbers for the plurality of hardware components currently attached to the main board of the device, and a hash value of the plurality of serial numbers for the plurality of hardware components currently attached to the main board of the device.

4. The method of claim 2, further comprising:
searching, when a record that includes the second hash value is not found, the repository for a record that includes a serial number of a hardware component attached to the main board of the device; and
updating, when the record that includes the second hash value is not found, the record that includes the serial number of the hardware component attached to the main board of the device to include the plurality of serial numbers for the plurality of hardware components currently attached to the main board of the device.

5. The method of claim 1, further comprising:
receiving, from the device over the network connection, a first Ethernet MAC address, a second Ethernet MAC address, a boot hard disk drive serial number, and a machine name, and
generating the second hash value, wherein the second hash value is generated from the first Ethernet MAC address, the second Ethernet MAC address, the boot hard disk drive serial number, and the machine name.

6. The method of claim 1, further comprising:
receiving, from the device over the network connection; a model number for the specific component attached to the main board manufacturer information for the specific component attached to the main board; a size of physical RAM attached to the main board; the clock speed of the RAM; an accelerated graphics port memory size of an accelerated graphics component attached to the main board; and a vendor ID of a hard disk drive attached to the main board; and
generating the second hash value from the model number for the specific component attached to the main board, the manufacturer information for the specific component attached to the main board, the size of the physical RAM attached to the main board, the clock speed of the RAM, the accelerated graphics port memory size of the accelerated graphics component attached to the main board, and the vendor ID of the hard disk drive attached to the main board.

7. A method for determining an identity of a particular device, where a repository comprises at least one record, where each record is associated with an associated device, said record further comprising identification data and a unique device identification generated using said identification data from a plurality of hardware components from said associated device, said method comprising:
gathering identification data identifying a plurality of hardware components currently attached to said particular device;
generating a second hash value from the gathered identification data that identified the plurality of hardware components currently attached to said particular device;
comparing said second hash value generated from the gathered identification data that identified the plurality of hardware components currently attached to said particular device to data stored in a repository, the data stored in the repository identifying hardware components previously attached to the particular device to determine if a record from among said at least one record matching said particular device is found; and
if a matching record from said repository is found, wherein said matching can be determined when a portion of the identification data identifying the hardware components currently attached to the device is inconsistent with the data stored in the repository identifying hardware components previously attached to the particular device by searching the repository for a first hash value generated from information stored in firmware of the main board of the device, associating said unique device identification from said matching record with said particular device.

8. The method of claim 7, further comprising:
if a matching record from among said at least one record is found, updating said stored identification data in said matching record using said gathered identification data.

9. The method of claim 7, said method further comprising:
if a matching record is not found, indicating that no matching record was found.

10. The method of claim 7, said method further comprising:
if a matching record is not found, adding a record to said repository comprising a new unique device identification for said device and said gathered identification data identifying the hardware components currently attached to the particular device.

11. The method of claim 7, where said step of gathering identification data identifying the hardware components currently attached to the particular device comprises gathering at least one item of identification data selected from the group consisting of: UUID on said device; model information on said device; manufacturer information on said device; serial number information on said device; a serial number of the boot hard disk drive on said device; a MAC address of a first Ethernet card on said device; a MAC address of a second Ethernet card on said device; an asset number on said device; machine name on said device; size of physical RAM on said device; RAM clock speed on said device; accelerated graphics port memory size on said device; vendor ID of the boot hard disk drive on said device; and product ID of the boot hard disk drive on said device.

12. The method of claim 7, where said step of gathering identification data comprising hardware component data from one of said devices comprises:
determining a gathering mode; and
gathering certain items of identification data based on said mode.

13. A system for maintaining device identities for at least one device, the system including a processor and a computer readable storage medium that comprises computer readable instructions configured to to effectuate:
a repository for storing at least one record, where each record is associated with one of said at least one devices, and where each record includes identification data identifying hardware components attached to a device at a first instance of time, a second hash value generated from the information identifying the hardware components attached to the device at the first instance of time, and a first hash value generated from information stored in firmware of a main board of the device;
a gatherer for requesting identification data from a device via a network connection;
a comparator for comparing identification data identifying hardware components currently attached to the device at a second instance of time to the identification data identifying the hardware components of the device at the first instance of time to determine if a matching record from said repository is found, wherein said matching can be determined when a portion of said identification data identifying the hardware components currently attached to the device at the second instance of time is inconsistent with the identification data identifying the hardware components attached to the device at the first instance of time; and an updater, for, if a matching record from among said at least one record is found, updating said identification data identifying the hardware components of the device at the first instance of time-with the identification data identifying hardware components currently attached to the device at the second instance of time.

14. The system of claim 13, said system further comprising instructions to effectuate:

a repository updater for, if a matching record is not found, adding a record to said repository comprising a new unique device identification for said device and the identification data identifying hardware components currently attached to the device at the second instance of time.

15. The system of claim 13, where said gatherer determines a gathering mode and gathers certain items of identification data based on said mode.

16. A system for determining the identity of a specific device with a record stored in a repository, the system including a processor and a computer readable storage medium that comprises computer readable instructions to effectuate:

a repository for storing at least one record, where each record is associated with a device from among a network comprising at least one devices, and where each record includes identification data identifying hardware components attached to a device at a first instance of time, a second hash value generated from the information identifying the hardware components attached to the device at the first instance of time, and a first hash value generated from information stored in firmware of a main board of the device;

a gatherer for requesting identification data from a device via a network connection;

a comparator for comparing identification data identifying hardware components currently attached to the device at a second instance of time to the identification data identifying the hardware components attached to the device at the first instance of time to determine if a matching record from said repository is found, wherein said matching can be determined when a portion of said identification data identifying the hardware components currently attached to the device at the second instance of time is inconsistent with the identification data identifying the hardware components attached to the device at the first instance of time; and an identity responder, for returning said second hash value from said matching record as the identity of said device if a matching record from among at least one record has been found.

17. The system of claim 16, where said identity responder is additionally configured to update the identification data identifying the hardware components attached to the device at the first instance of time with the identification data identifying hardware components currently attached to the device at the second instance of time if a matching record from among said at least one record has been found.

18. The system of claim 16, where said identity responder, if a matching record is not found, indicates that no matching record was found.

19. The system of claim 18, where said identity responder, if a matching record is not found, indicates that no matching record was found, adds a record to said repository comprising a new unique device identification for said device and the identification data identifying hardware components currently attached to the device at the second instance of time.

20. The system of claim 16, where said gatherer determines a gathering mode and gathers certain items of identification data based on said mode.

* * * * *